US012621108B2

(12) United States Patent
Kim et al.

(10) Patent No.: US 12,621,108 B2
(45) Date of Patent: May 5, 2026

(54) METHOD AND APPARATUS FOR UPLINK TRANSMISSION PARAMETER CONFIGURATION IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Haewook Park, Seoul (KR); Kyuseok Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 508 days.

(21) Appl. No.: 17/974,265

(22) Filed: Oct. 26, 2022

(65) Prior Publication Data

US 2023/0239113 A1 Jul. 27, 2023

(30) Foreign Application Priority Data

Jan. 21, 2022 (KR) ........................ 10-2022-0009444

(51) Int. Cl.
*H04L 5/00* (2006.01)
*H04B 7/06* (2006.01)
(52) U.S. Cl.
CPC .......... *H04L 5/0053* (2013.01); *H04L 5/0048* (2013.01)
(58) Field of Classification Search
CPC ............... H04L 5/0023; H04L 5/0044; H04W 72/1268; H04W 72/23; H04W 72/21; H04B 7/0639; H04B 7/0456
See application file for complete search history.

(56) References Cited

U.S. PATENT DOCUMENTS

2020/0314860 A1 10/2020 Zhou et al.
2021/0022167 A1 1/2021 Khoshnevisan et al.
(Continued)

FOREIGN PATENT DOCUMENTS

CN 113259073 8/2021
WO 2021183029 9/2021
(Continued)

OTHER PUBLICATIONS

3GPP TSG RAN WG1 Meeting#84, R1-160422 Title:On te need to support PUCCH for eLAA (Year: 2016).*
(Continued)

*Primary Examiner* — Faruk Hamza
*Assistant Examiner* — Abusayeed M Haque
(74) *Attorney, Agent, or Firm* — LEE, HONG, DEGERMAN, KANG & WAIMEY

(57) ABSTRACT

A method and an apparatus of performing an uplink transmission or reception in a wireless communication system are disclosed. According to an embodiment of the present disclosure may comprise receiving, from a network, a plurality of transmission parameter sets, wherein the plurality of transmission parameter sets correspond to a plurality of control resource set (CORESET) pools, respectively; and performing, in a single time unit, a first uplink transmission related to a first CORESET pool based on a first transmission parameter set, and a second uplink transmission related to a second CORESET pool based on a second transmission parameter set, wherein each of the first transmission parameter set and the second transmission parameter set includes at least one of information related to transmit precoding matrix indicator (TPMI), information related to sounding reference signal (SRS), or information related to scrambling.

7 Claims, 10 Drawing Sheets

Receiving information on plurality of transmission parameter sets from network — S810

Performing plurality of uplink transmissions based on plurality of transmission parameter sets in single time unit — S820

(56) References Cited

U.S. PATENT DOCUMENTS

| | | | | |
|---|---|---|---|---|
| 2021/0289525 A1* | 9/2021 | Khoshnevisan | ........ | H04L 1/189 |
| 2022/0007410 A1 | 1/2022 | Cirik et al. | | |
| 2023/0046727 A1* | 2/2023 | Jung | .................... | H04W 16/28 |
| 2023/0144010 A1* | 5/2023 | Kwak | .................. | H04L 5/0053 |
| | | | | 370/329 |
| 2023/0239114 A1* | 7/2023 | Kim | .................... | H04W 16/28 |
| | | | | 370/329 |

FOREIGN PATENT DOCUMENTS

| | | | | | |
|---|---|---|---|---|---|
| WO | 2021187823 | | 9/2021 | | |
| WO | 2022005114 | | 1/2022 | | |
| WO | WO-2022026663 | A2 * | 2/2022 | ........... | H04L 5/0044 |
| WO | WO-2022029696 | A1 * | 2/2022 | ........... | H04L 5/0053 |

OTHER PUBLICATIONS

3GPP TSG RAN WG1 Meeting#84, R1-160422 Title:On the need to support PUCCH for eLAA (Year: 2016).*

3GPP TSG RAN WG1 Meeting#72-bis, R1-131523 Title:Considerationon reference signal in TDD special subframe (Year: 2013).*

Korean Intellectual Property Office Application No. 10-2022-0121328, Office Action dated Apr. 8, 2024, 6 pages.

Samsung, "Enhancements on Multi-TRP for PDCCH, PUCCH and PUSCH," 3GPP TSG RAN WG1 #106b-e, R1-2109469, Oct. 2021, 15 pages.

CATT, "Moderator summary on M-TRP simultaneous transmission with multiple Rx panels (round 2)," 3GPP TSG RAN WG1 Meeting #104-e, R1-2102153, Feb. 2021, 15 pages.

ZTE, "Enhancements on beam management for multi-TRP," 3GPP TSG RAN WG1 Meeting #106bis-e, R1-2108873, Oct. 2021, 14 pages.

ZTE, "Multi-TRP enhancements for PDCCH, PUCCH and PUSCH," 3GPP TSG RAN WG1 Meeting #106-e, R1-2106542, Aug. 2021, 19 pages.

Samsung, "Enhancements on Multi-TRP/Panel Transmission," 3GPP TSG RAN WG1 Meeting#99 R1-1912482, Nov. 2019, 13 pages.

The State Intellectual Property Office of the People's Republic of China Application Serial No. 202211315120.1, Office Action dated Jul. 4, 2025, 10 pages.

Vivo, "Remaining issues on Multi-TRP for PDCCH, PUCCH and PUSCH enhancements", R1-2110991, 3GPP TSG RAN WG1 #107-e, Nov. 2021, 21 pages.

* cited by examiner

FIG.6

METHOD AND APPARATUS FOR UPLINK TRANSMISSION PARAMETER CONFIGURATION IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2022-0009444, filed Jan. 21, 2022, the contents of which are hereby incorporated by reference herein in its entirety.

TECHNICAL FIELD

The present disclosure relates to a wireless communication system, and in more detail, relates to a method and an apparatus of performing an uplink transmission or reception in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Object

A technical object of the present disclosure is to provide a method and an apparatus of performing an uplink transmission or reception in a wireless communication system.

An additional technical object of the present disclosure is to provide a method and an apparatus for performing a simultaneous uplink transmission or reception related to multiple transmission element and/or multiple transmission target in a wireless communication system.

An additional technical object of the present disclosure is to provide a method and an apparatus for performing multiple transmission element-specific and/or multiple transmission target-specific simultaneous uplink transmission or reception in a wireless communication system.

The technical objects to be achieved by the present disclosure are not limited to the above-described technical objects, and other technical objects which are not described herein will be clearly understood by those skilled in the pertinent art from the following description.

Technical Solution

A method of performing an uplink transmission by a terminal in a wireless communication system according to an aspect of the present disclosure may comprise receiving, from a network, a plurality of transmission parameter sets, wherein the plurality of transmission parameter sets correspond to a plurality of control resource set (CORESET) pools, respectively; and performing, in a single time unit, a first uplink transmission related to a first CORESET pool based on a first transmission parameter set, and a second uplink transmission related to a second CORESET pool based on a second transmission parameter set, wherein each of the first transmission parameter set and the second transmission parameter set includes at least one of information related to transmit precoding matrix indicator (TPMI), information related to sounding reference signal (SRS), or information related to scrambling.

A method of receiving an uplink transmission by a base station in a wireless communication system according to an additional aspect of the present disclosure may comprise transmitting, to a terminal, a plurality of transmission parameter sets, wherein the plurality of transmission parameter sets correspond to a plurality of control resource set (CORESET) pools, respectively; and receiving, in a single time unit, a first uplink transmission related to a first CORESET pool based on a first transmission parameter set, and a second uplink transmission related to a second CORESET pool based on a second transmission parameter set, wherein each of the first transmission parameter set and the second transmission parameter set includes at least one of information related to transmit precoding matrix indicator (TPMI), information related to sounding reference signal (SRS), or information related to scrambling.

Technical Effects

According to an embodiment of the present disclosure, a method and an apparatus of performing an uplink transmission or reception in a wireless communication system may be provided.

According to an embodiment of the present disclosure, a method and an apparatus for performing a simultaneous uplink transmission or reception related to multiple transmission element and/or multiple transmission target in a wireless communication system may be provided.

According to an embodiment of the present disclosure, a method and an apparatus for performing multiple transmission element-specific and/or multiple transmission target-specific simultaneous uplink transmission or reception in a wireless communication system may be provided.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

BEST MODE

Figure 1:
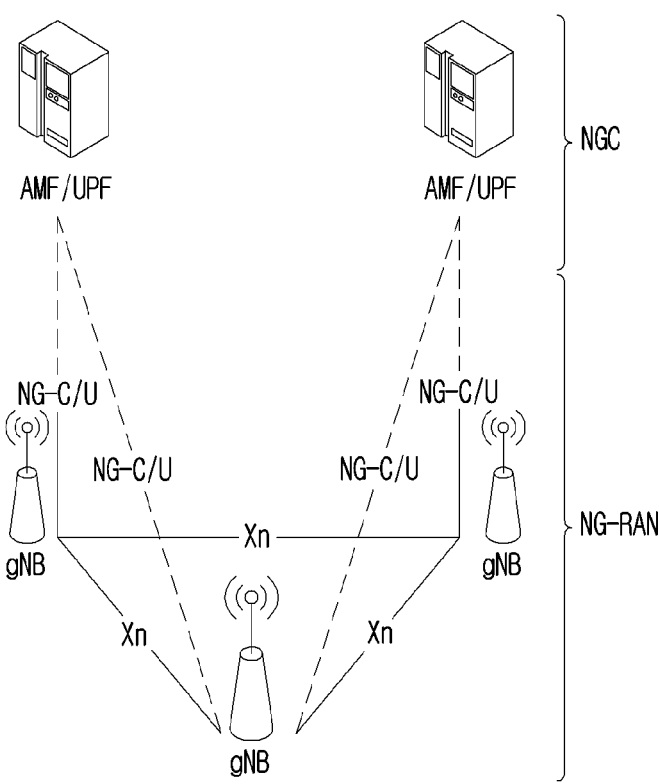
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
  CQI: Channel Quality Indicator
  CRI: channel state information—reference signal resource indicator
  CSI: channel state information
  CSI-IM: channel state information—interference measurement
  CSI-RS: channel state information—reference signal
  DMRS: demodulation reference signal
  FDM: frequency division multiplexing
  FFT: fast Fourier transform
  IFDMA: interleaved frequency division multiple access
  IFFT: inverse fast Fourier transform
  L1-RSRP: Layer 1 reference signal received power
  L1-RSRQ: Layer 1 reference signal received quality
  MAC: medium access control
  NZP: non-zero power
  OFDM: orthogonal frequency division multiplexing
  PDCCH: physical downlink control channel
  PDSCH: physical downlink shared channel
  PMI: precoding matrix indicator
  RE: resource element
  RI: Rank indicator
  RRC: radio resource control
  RSSI: received signal strength indicator
  Rx: Reception
  QCL: quasi co-location
  SINR: signal to interference and noise ratio
  SSB (or SS/PBCH block): Synchronization signal block (including PSS (primary synchronization signal), SSS (secondary synchronization signal) and PBCH (physical broadcast channel))
  TDM: time division multiplexing
  TRP: transmission and reception point
  TRS: tracking reference signal
  Tx: transmission
  UE: user equipment
  ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
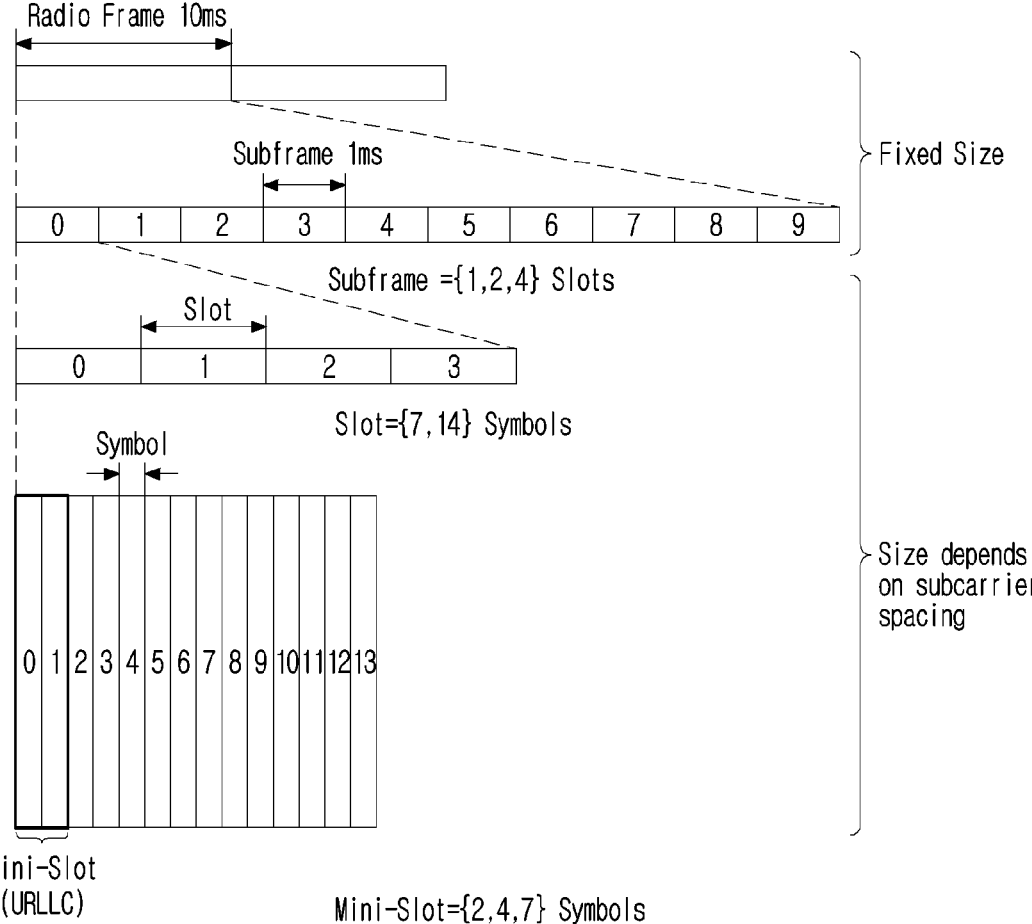
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} \cdot N_f/100) \cdot T_c=10$ ms. Here, a radio frame is configured with 10 subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot $(N_{symb}^{slot})$, the number of slots per radio frame $(N_{slot}^{frame,\mu})$ and the number of slots per subframe $(N_{slot}^{subframe,\mu})$ in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |

TABLE 3-continued

| μ | $N_{symb}^{slot}$ | $N_{slot}^{frame, \mu}$ | $N_{slot}^{subframe, \mu}$ |
|---|---|---|---|
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
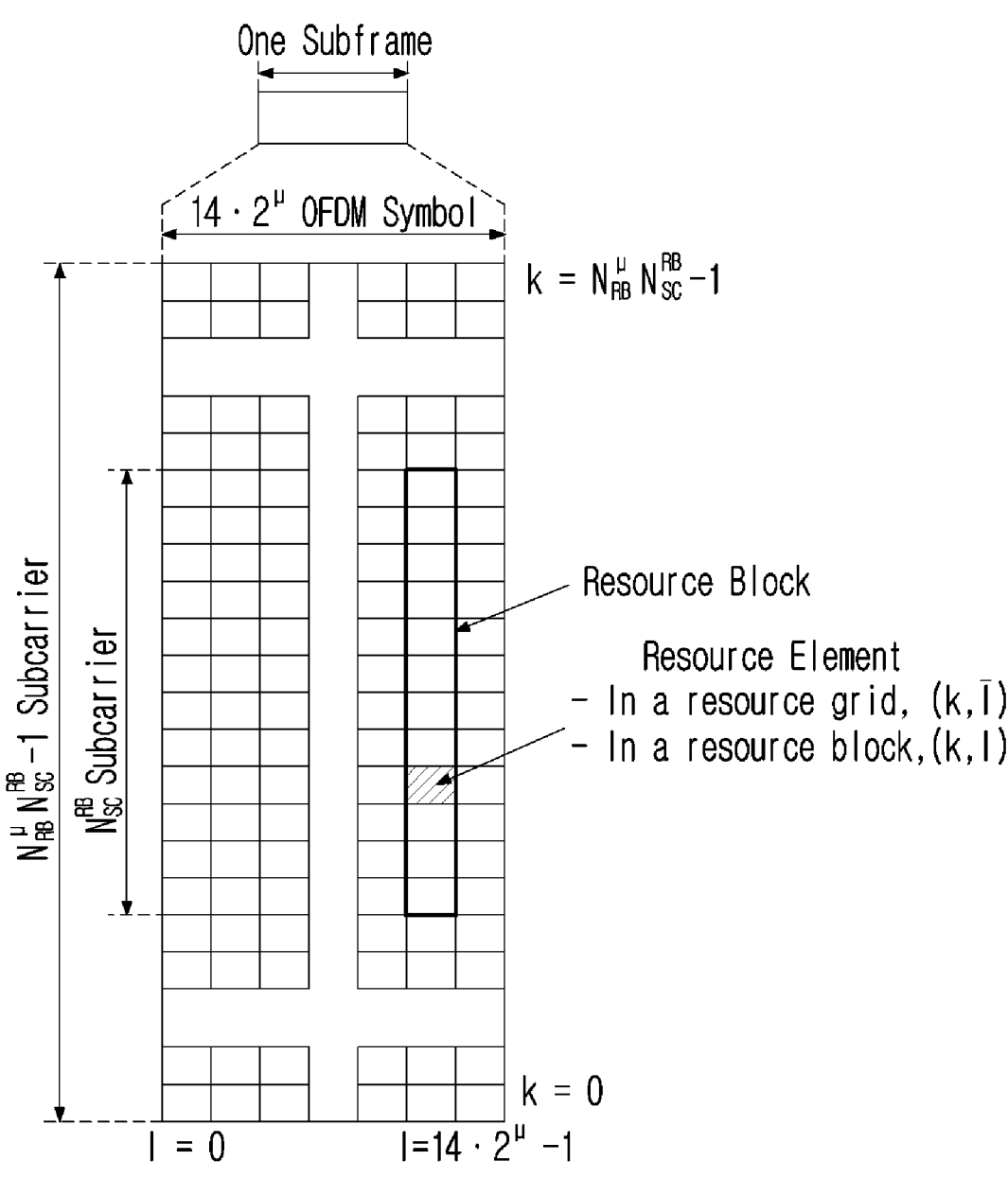
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for p and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows:
offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration $\mu$ is identical to 'point A'. A relationship between a common resource block number $n_{CRB}^{\mu}$ and a resource element (k,l) for a subcarrier spacing configuration p in a frequency domain is given as in the following Equation 1.

$$n_{CRB}^{\mu} = \left[ \frac{k}{N_{sc}^{RB}} \right]$$ [Equation 1]

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu}$$ [Equation 2]

$N_{BWP,i}^{start,\mu}$ is a common resource block that a BWP starts relatively to common resource block 0.

Figure 4:
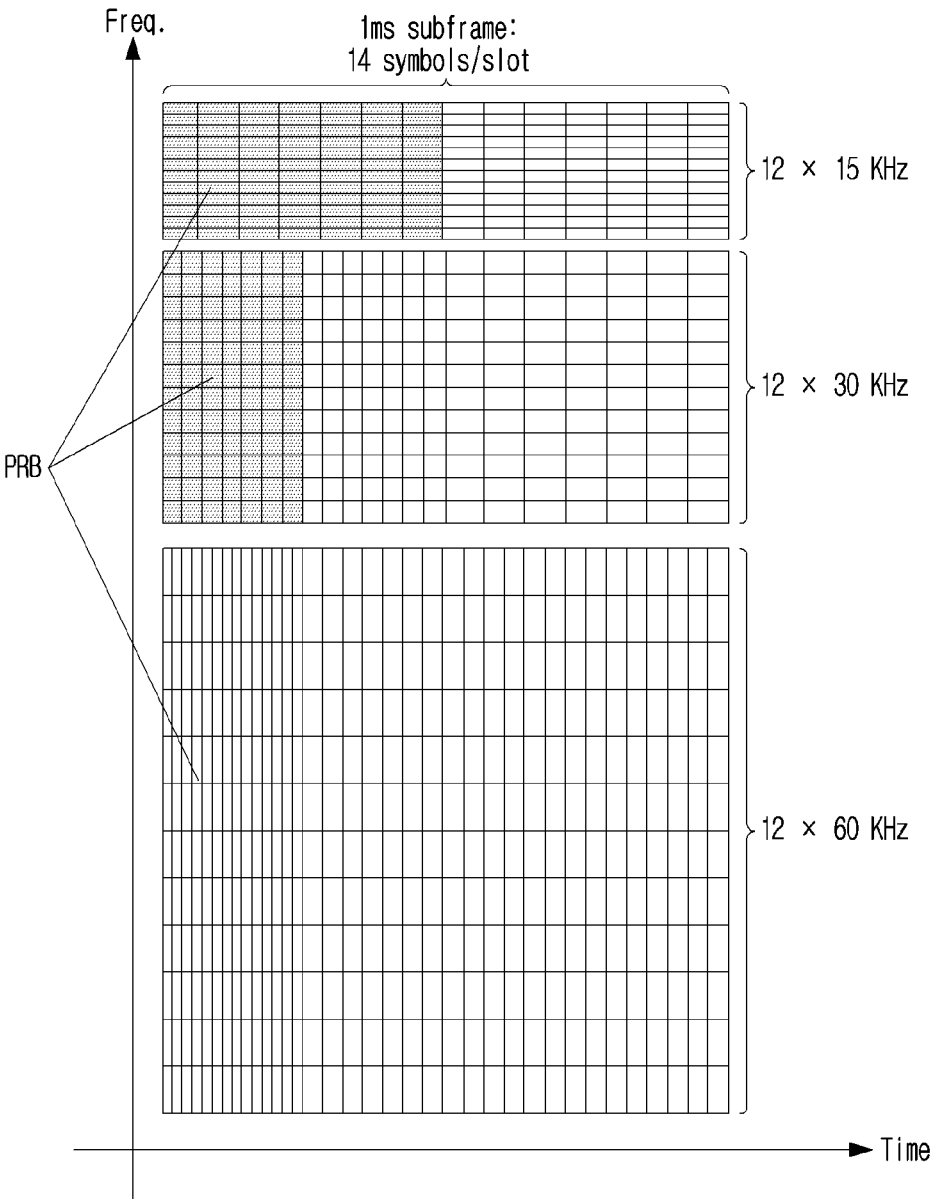
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
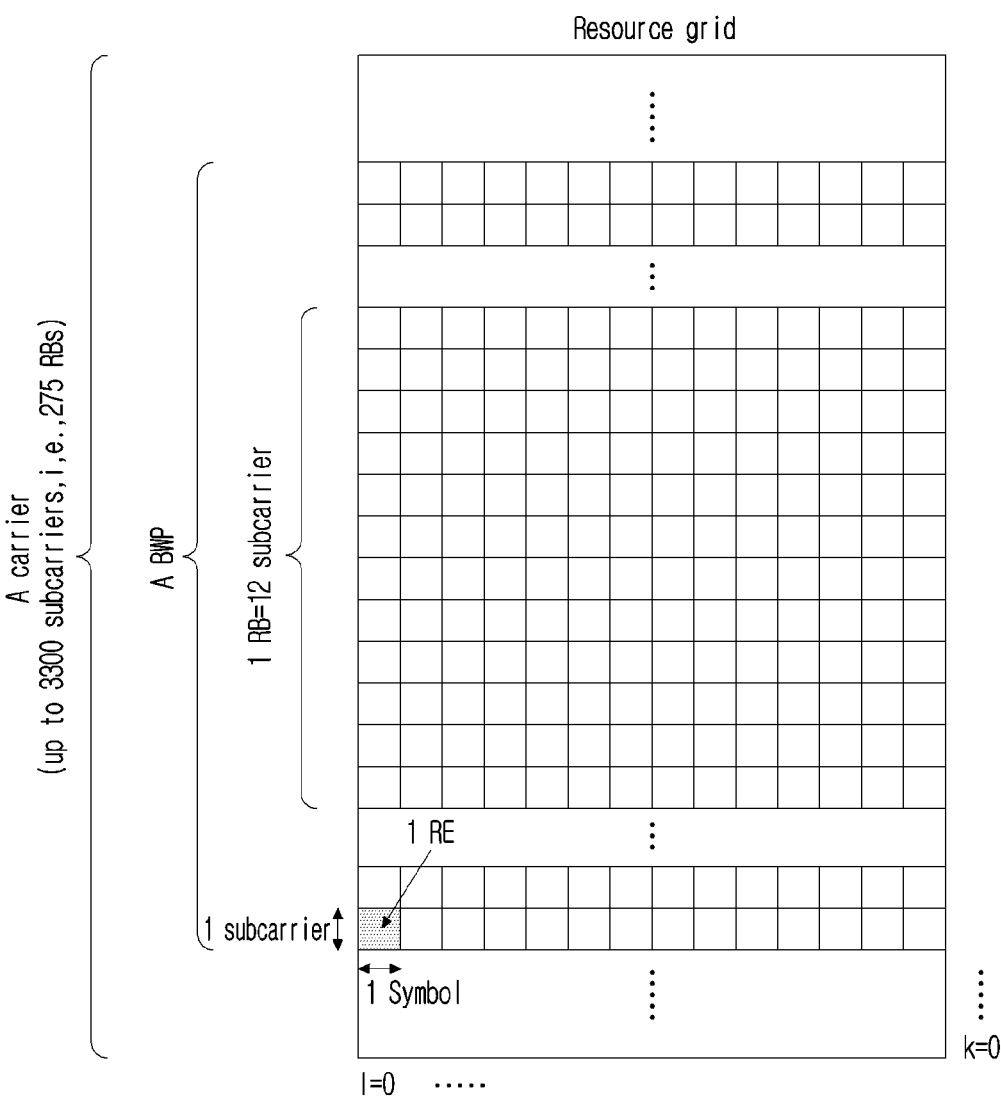
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a sub-carrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
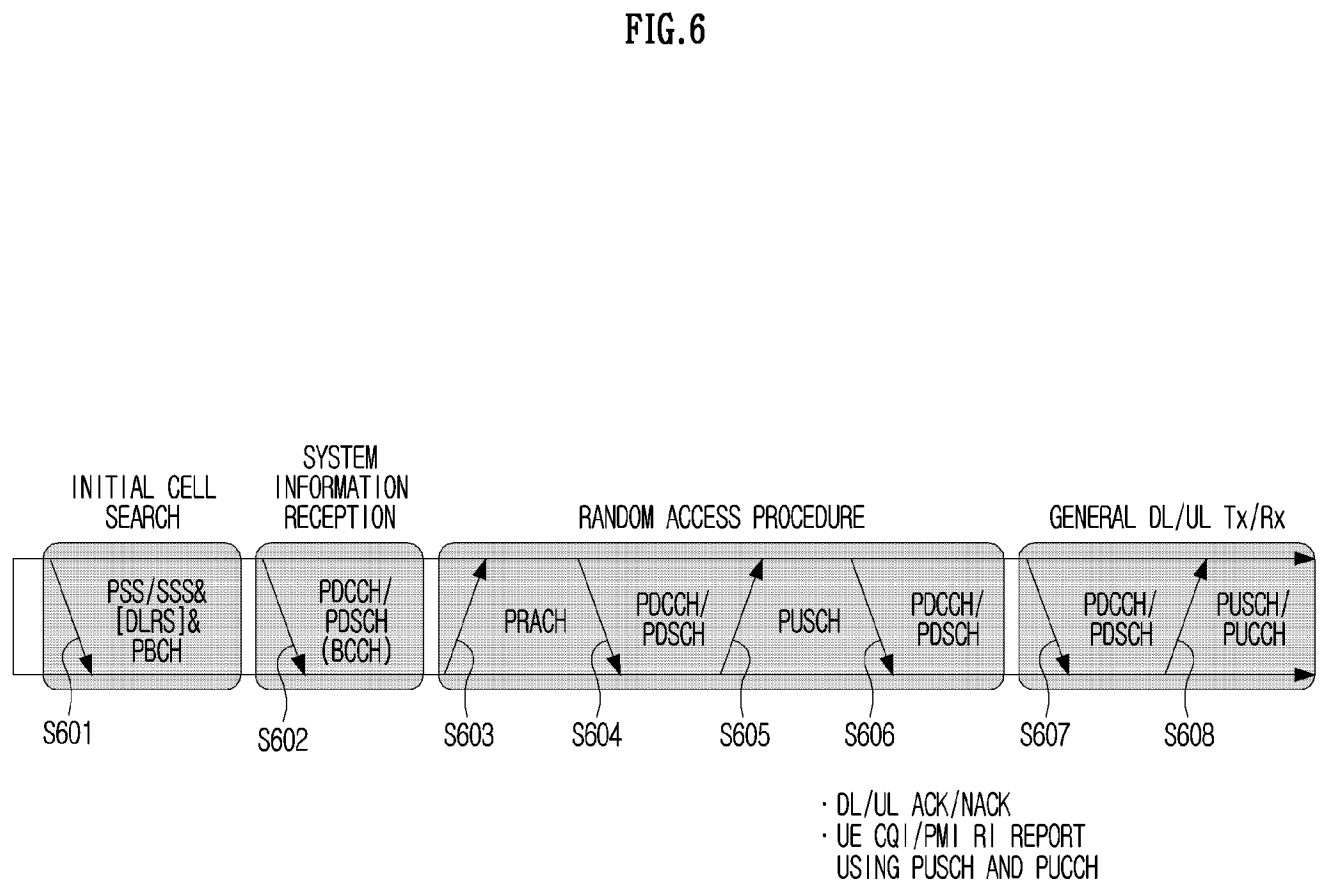

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORE-SET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORE-SET group. (Here, a CORESET group may be identified by an index defined in a CORESET configuration of each CORESET. For example, when index=0 is configured for CORESETs 1 and 2 and index=1 is configured for CORE-SETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORE-SET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group).

Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
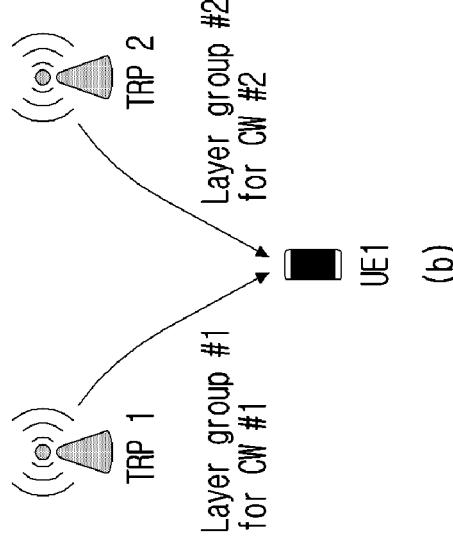
FIG. 7 illustrates a method of transmitting multiple TRPs in a wireless communication system to which the present disclosure may be applied.
Figure 7:
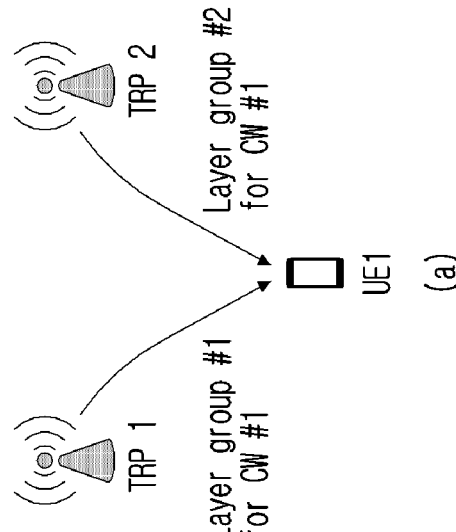

FIG. 7 illustrates a method of multiple TRPs transmission in a wireless communication system to which the present disclosure may be applied.

In reference to FIG. 7(*a*), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(*b*), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(*b*), it may have a disadvantage that a code rate corresponding to a TB is higher compared to FIG. 7(*a*). However, it has an advantage that it may adjust a code rate by indicating a different RV (redundancy version) value or may adjust a modulation order of each CW for encoded bits generated from the same TB according to a channel environment.

According to methods illustrated in FIG. 7(*a*) and FIG. 7(*b*) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following method is discussed.

1) Method 1 (SDM): Time and frequency resource allocation is overlapped and n (n<=Ns) TCI states in a single slot
    1-a) Method 1a
      The same TB is transmitted in one layer or layer set at each transmission time (occasion) and each layer or each layer set is associated with one TCI and one set of DMRS port(s).
      A single codeword having one RV is used in all spatial layers or all layer sets. With regard to UE, different coded bits are mapped to a different layer or layer set by using the same mapping rule.
    1-b) Method 1b
      The same TB is transmitted in one layer or layer set at each transmission time (occasion) and each layer or each layer set is associated with one TCI and one set of DMRS port(s).
      A single codeword having one RV is used in each spatial layer or each layer set. RV(s) corresponding to each spatial layer or each layer set may be the same or different.
    1-c) Method 1c
      At one transmission time (occasion), the same TB having one DMRS port associated with multiple TCI state indexes is transmitted in one layer or the same TB having multiple DMRS ports one-to-one associated with multiple TCI state indexes is transmitted in one layer.
In case of the method 1a and 1c, the same MCS is applied to all layers or all layer sets.

2) Method 2 (FDM): Frequency resource allocation is not overlapped and n (n<=Nf) TCI states in a single slot
    Each non-overlapping frequency resource allocation is associated with one TCI state.
    The same single/multiple DMRS port(s) are associated with all non-overlapping frequency resource allocation.
    2-a) Method 2a
      A single codeword having one RV is used for all resource allocation. With regard to UE, common RB matching (mapping of a codeword to a layer) is applied to all resource allocation.
    2-b) Method 2b
      A single codeword having one RV is used for each non-overlapping frequency resource allocation. A RV corresponding to each non-overlapping frequency resource allocation may be the same or different.
    For the method 2a, the same MCS is applied to all non-overlapping frequency resource allocation.

3) Method 3 (TDM): Time resource allocation is not overlapped and n (n<=Nt1) TCI states in a single slot
    Each transmission time (occasion) of a TB has time granularity of a mini-slot and has one TCI and one RV.
    A common MCS is used with a single or multiple DMRS port(s) at every transmission time (occasion) in a slot.
    A RV/TCI may be the same or different at a different transmission time (occasion).

4) Method 4 (TDM): n (n<=Nt2) TCI states in K (n<=K) different slots
    Each transmission time (occasion) of a TB has one TCI and one RV.
    Every transmission time (occasion) across K slots uses a common MCS with a single or multiple DMRS port(s).
    A RV/TCI may be the same or different at a different transmission time (occasion).

Hereinafter, MTRP URLLC is described.

In the present disclosure, DL MTRP URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is configured from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 may be configured. UE may achieve high reliability because it receives the same data/DCI through resource 1 and resource 2. Such DL MTRP URLLC may be applied to a PDSCH/a PDCCH.

And, in the present disclosure, UL MTRP-URLLC means that multiple TRPs receive the same data/UCI (uplink control information) from any UE by using a different layer/time/frequency resource. For example, TRP 1 receives the same data/DCI from UE in resource 1 and TRP 2 receives the same data/DCI from UE in resource 2 to share received data/DCI through a backhaul link connected between TRPs. UE configured with a UL MTRP-URLLC transmission method transmits the same data/UCI by using a different layer/time/frequency resource. In this case, UE is configured from a base station for which Tx beam and which Tx power (i.e., a UL TCI state) should be used in a layer/time/ frequency resource transmitting the same data/DCI. For example, when the same data/UCI is transmitted in resource 1 and resource 2, a UL TCI state used in resource 1 and a UL TCI state used in resource 2 may be configured. Such UL MTRP URLLC may be applied to a PUSCH/a PUCCH.

In addition, in the present disclosure, when a specific TCI state (or TCI) is used (or mapped) in receiving data/DCI/ UCI for any frequency/time/space resource (layer), it means as follows. For a DL, it may mean that a channel is estimated from a DMRS by using a QCL type and a QCL RS indicated by a corresponding TCI state in that frequency/time/space resource (layer) and data/DCI is received/demodulated based on an estimated channel. In addition, for a UL, it may mean that a DMRS and data/UCI are transmitted/modulated by using a Tx beam and power indicated by a corresponding TCI state in that frequency/time/space resource.

Here, an UL TCI state has Tx beam and/or Tx power information of UE and may configure spatial relation information, etc. to UE through other parameter, instead of a TCI state. An UL TCI state may be directly indicated by UL grant DCI or may mean spatial relation information of a SRS resource indicated by a SRI (sounding resource indicator) field of UL grant DCI. Alternatively, it may mean an open loop (OL) Tx power control parameter connected to a value indicated by a SRI field of UL grant DCI (e.g., j: an index for open loop parameter Po and alpha (up to 32 parameter value sets per cell), q_d: an index of a DL RS resource for PL (pathloss) measurement (up to 4 measurements per cell), l: a closed loop power control process index (up to 2 processes per cell)).

Hereinafter, MTRP eMBB is described.

In the present disclosure, MTRP-eMBB means that multiple TRPs transmit different data (e.g., a different TB) by using a different layer/time/frequency. UE configured with a MTRP-eMBB transmission method receives an indication on multiple TCI states through DCI and assumes that data received by using a QCL RS of each TCI state is different data.

On the other hand, UE may figure out whether of MTRP URLLC transmission/reception or MTRP eMBB transmission/reception by separately dividing a RNTI for MTRP-URLLC and a RNTI for MTRP-eMBB and using them. In other words, when CRC masking of DCI is performed by using a RNTI for URLLC, UE considers it as URLLC transmission and when CRC masking of DCI is performed by using a RNTI for eMBB, UE considers it as eMBB transmission. Alternatively, a base station may configure MTRP URLLC transmission/reception or TRP eMBB transmission/reception to UE through other new signaling.

In a description of the present disclosure, it is described by assuming cooperative transmission/reception between 2 TRPs for convenience of a description, but a method proposed in the present disclosure may be also extended and applied in 3 or more multiple TRP environments and in addition, it may be also extended and applied in multiple panel environments (i.e., by matching a TRP to a panel). In addition, a different TRP may be recognized as a different TCI state to UE. Accordingly, when UE receives/transmits data/DCI/UCI by using TCI state 1, it means that data/DCI/ UCI is received/transmitted from/to a TRP 1.

Hereinafter, methods proposed in the present disclosure may be utilized in a situation that MTRPs cooperatively transmit a PDCCH (repetitively transmit or partitively transmit the same PDCCH). In addition, methods proposed in the present disclosure may be also utilized in a situation that MTRPs cooperatively transmit a PDSCH or cooperatively receive a PUSCH/a PUCCH.

In addition, in the present disclosure, when a plurality of base stations (i.e., MTRPs) repetitively transmit the same PDCCH, it may mean the same DCI is transmitted through multiple PDCCH candidates and it may also mean that a plurality of base stations repetitively transmit the same DCI. Here, the same DCI may mean two DCI with the same DCI format/size/payload. Alternatively, although two DCI has a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception occasion of DCI, so if DCI received at n occasions and DCI received at n+1 occasions inform UE of the same scheduling result, a TDRA field of two DCI is different and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of the other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRPs) partitively transmit the same PDCCH, it means that one DCI is transmitted through one PDCCH candidate, but TRP 1 transmits some resources that such a PDCCH candidate is defined and TRP 2 transmits the remaining resources. For example, when a PDCCH candidate corresponding to aggregation level m1+m2 is partitively transmitted by TRP 1 and TRP 2, a PDCCH candidate may be divided into PDCCH candidate 1 corresponding to aggregation level m1 and PDCCH candidate 2 corresponding to aggregation level m2, and TRP 1 may transmit PDCCH candidate 1 and TRP 2 may transmit PDCCH candidate 2 to a different time/frequency resource. After receiving PDCCH candidate 1 and PDCCH candidate 2, UE may generate a PDCCH candidate corresponding to aggregation level m1+m2 and try DCI decoding.

In addition, in the present disclosure, when UE repetitively transmits the same PUSCH so that a plurality of base stations (i.e., MTRPs) can receive it, it may mean that UE transmitted the same data through multiple PUSCHs. In this case, each PUSCH may be optimized and transmitted to an UL channel of a different TRP. For example, when UE repetitively transmits the same data through PUSCH 1 and 2, PUSCH 1 is transmitted by using UL TCI state 1 for TRP 1 and in this case, link adaptation such as a precoder/MCS, etc. may be also scheduled/applied to a value optimized for a channel of TRP 1. PUSCH 2 is transmitted by using UL TCI state 2 for TRP 2 and link adaptation such as a precoder/MCS, etc. may be also scheduled/applied to a value optimized for a channel of TRP 2. In this case, PUSCH 1 and 2 which are repetitively transmitted may be transmitted at a different time to be TDM, FDM or SDM.

In addition, in the present disclosure, when UE partitively transmits the same PUSCH so that a plurality of base stations (i.e., MTRPs) can receive it, it may mean that UE transmits one data through one PUSCH, but it divides resources allocated to that PUSCH, optimizes them for an UL channel of a different TRP and transmits them. For example, when UE transmits the same data through 10 symbol PUSCHs, data is transmitted by using UL TCI state 1 for TRP 1 in 5 previous symbols and in this case, link adaptation such as a precoder/MCS, etc. may be also scheduled/applied to a value optimized for a channel of TRP 1. The remaining data is transmitted by using UL TCI state 2 for TRP 2 in the remaining 5 symbols and in this case, link adaptation such as a precoder/MCS, etc. may be also scheduled/applied to a value optimized for a channel of TRP 2. In the example, transmission for TRP 1 and transmission for TRP 2 are TDM-ed by dividing one PUSCH into time resources, but it may be transmitted by a FDM/SDM method.

In addition, similarly to the above-described PUSCH transmission, also for a PUCCH, UE may repetitively transmit the same PUCCH or may partitively transmit the same PUCCH so that a plurality of base stations (i.e., MTRPs) receive it.

Hereinafter, a proposal of the present disclosure may be extended and applied to a variety of channels such as a PUSCH/a PUCCH/a PDSCH/a PDCCH, etc.

A proposal of the present disclosure may be extended and applied to both a case in which various uplink/downlink channels are repetitively transmitted to a different time/frequency/space resource and a case in which various uplink/downlink channels are partitively transmitted to a different time/frequency/space resource.

In the present disclosure, a transmission occasion (TO) may correspond to a resource unit in which a channel is transmitted/received or a candidate resource unit in which a channel may be transmitted/received. For example, when multiple channels are transmitted in the TDM scheme, TO may mean each channel that is or may be transmitted in different time resources. For example, when multiple channels are transmitted in the FDM scheme, TO may mean each channel that is or may be transmitted in different frequency resources (e.g., RBs). For example, when multiple channels are transmitted in the SDM scheme, TO may mean each channel that is or may be transmitted in different layers/beams/DMRS ports. One TCI state may be mapped to each TO. When the same channel is repeatedly transmitted, a complete DCI/data/UCI may be transmitted in one TO, and the receiving end may receive multiple TOs to increase the reception success rate.

The above-described single DCI (S-DCI)-based multi-TB PUSCH/PDSCH scheduling scheme may be applied, for example, to a case that one DCI simultaneously schedules a plurality of PUSCH/PDSCHs in a very high frequency band (e.g., band above 5.26 GHz). For example, multiple time-domain resource allocations (TDRAs) (or TOs) may be indicated at once through a TDRA field of DCI for scheduling PUSCH, and different TBs may be transmitted through a PUSCH in each TO. Frequency domain resource allocation (FDRA), MCS, transmit precoding matrix indicator (TPMI), SRI values of Multi-TB PUSCH scheduling DCI may be commonly applied to a plurality of TBs scheduled by the corresponding DCI. In addition, NDI, RV may be individually/independently indicated for each TB through the multi-TB PUSCH scheduling DCI. In addition, in such multi-TB PUSCH scheduling DCI, one value is indicated for the HARQ (process) number (HPN), but values sequentially increasing in the TO order from the initial TO may be applied.

Simultaneous Transmission/Reception Related to Multiple Transmission Elements/Multiple Transmission Targets New methods in which a terminal simultaneously transmits several channels (CH)/reference signals (RSs) of the same type, the terminal simultaneously transmits several CHs/RSs of different types are being discussed. In the conventional scheme, the operation of the terminal transmitting a plurality of CHs/RSs in one time point (or in one time unit) is restricted. For example, for a terminal according to the conventional scheme, simultaneous transmission of a plurality of SRS resources belonging to different SRS resource sets is supported for uplink beam measurement, but simultaneous transmission of a plurality of different PUSCHs is not supported. Therefore, in order to support a more advanced terminal operation by alleviating the above restrictions, a method for simultaneously transmitting a plurality of CHs/RSs using a plurality of transmission elements of one terminal is being discussed.

For example, according to the present disclosure, a terminal may simultaneously perform uplink transmissions for multiple transmission targets using multiple transmission elements. In addition, the base station may simultaneously receive the uplink transmissions transmitted through the multiple transmission elements from the terminal in the multiple transmission targets. For example, a transmission element of the terminal may correspond to an antenna group or an antenna panel, and one antenna group/panel may correspond to one RS set (or one RS candidate set). That is, the antenna group/panel may be indicated/identified by the RS (candidate) set. For example, the transmission target of uplink transmission from the terminal may correspond to a TRP or a cell, and one TRP/cell may correspond to one CORESET group/pool. That is, the TRP/cell may be indicated/identified by the CORESET group/pool. For example, a simultaneous uplink transmission scheme for multiple transmission targets through multiple transmission elements may be referred to as simultaneous transmission across multi-panel (STxMP). However, the scope of the present disclosure is not limited by the name of the transmission scheme, the examples of the unit of the transmission element, and/or the examples of the unit of the transmission target.

As one example of STxMP operation, two PUSCHs corresponding to two UL TBs (e.g., a first PUSCH carrying a first TB, a second PUSCH carrying a second TB) may be scheduled on the same RB. In addition, an individual TCI state may be configured/indicated for each of a plurality of PUSCH transmissions. A plurality of TCI states may correspond to a plurality of transmission elements (e.g., a panel/RS set), respectively. In addition, one transmission element may correspond to one transmission target, respectively, and a plurality of transmission elements may correspond to one transmission target.

For example, a first spatial relation RS and a first power control (PC) parameter set (or a first UL TCI state) may be configured/indicated for a first PUSCH transmission, and a second spatial relation RS and a second PC parameter set (or a second UL TCI state) may be configured/indicated for a second PUSCH transmission. For example, the terminal may transmit a first PUSCH using a first panel corresponding to a first UL TCI state in a first time unit, and may transmit a second PUSCH using a second panel corresponding to a second UL TCI state in the first time unit. For example, the terminal may transmit (for the first CORESET pool) the first PUSCH through the first RS set based on the first UL TCI state in the first time unit, and may transmit the second PUSCH (for the second CORESET pool) through the second RS set based on the second UL TCI in the first time unit. A time unit may correspond to at least one of a symbol, a symbol group, a slot, or a slot group.

Figure 8:
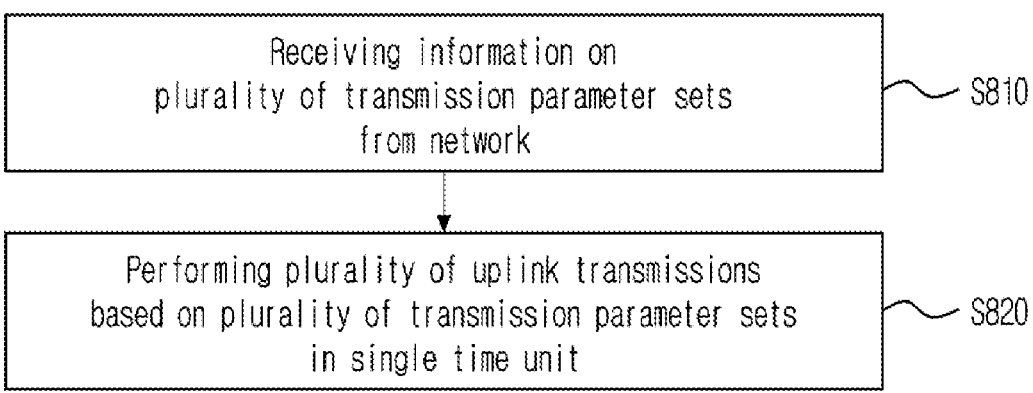
FIG. 8 is a flow chart for describing an example of a method for an uplink transmission by a terminal according to the present disclosure.

FIG. 8 is a diagram for illustrating an example of an uplink transmission method of a terminal according to the present disclosure.

In step S810, the terminal may receive information on a plurality of transmission parameter sets from the network.

The plurality of transmission parameter sets may correspond to a plurality of transmission targets (e.g., CORESET pools, CORESET groups, or TRPs), respectively.

For example, each of the first transmission parameter set and the second transmission parameter set may include at least one of information related to transmit precoding matrix indicator (TPMI), information related to sounding reference signal (SRS), or information related to scrambling.

For example, the plurality of transmission parameter sets may include different or independent transmission parameters. For example, the first transmission parameter set may include at least one of first information related to TPMI, first information related to SRS, or first information related to scrambling. The second transmission parameter set may include at least one of second information related to TPMI, second information related to SRS, or second information related to scrambling.

For example, the information related to TPMI may include at least one of full power transmission information, codebook subset information, transmission configuration (tx config) information, or maximum rank (max rank) information.

For example, the information related to SRS may include at least one of power control information, antenna port information, or reference SRS resource information.

For example, the information related to scrambling may include at least one of data scrambling identity information for a physical uplink shared channel (PUSCH).

For example, information on at least one set of the plurality of transmission parameter sets may be indicated by at least one of MAC CE, or DCI. In addition, candidates for the at least one transmission parameter may be configured (in advance) by higher layer (e.g., RRC) signaling, or may be defined (in advance) without signaling between the terminal and the network.

In step S820, the terminal may perform a plurality of uplink transmissions based on a plurality of transmission parameter sets in a single time unit.

For example, a first uplink transmission related to a first CORESET pool based on a first transmission parameter set, and a second uplink transmission related to a second CORE-SET pool based on a second transmission parameter set may be performed in a single time unit.

For example, performing a plurality of uplink transmissions in a single time unit may include performing a first uplink transmission and a second uplink transmission simultaneously.

For example, a plurality of uplink transmissions may correspond to a plurality of transmission elements (e.g., antenna panels, reference signal (RS) sets, RS candidate sets, etc.), respectively.

For example, the first uplink transmission may be performed through/based on a first transmission element (e.g., a first antenna panel, a first RS set, a first RS candidate set, etc.). For example, the second uplink transmission may be performed through/based on the second transmission element (e.g., the second antenna panel, the second RS set, the second RS candidate set, etc.).

For example, a first transmission target (e.g., a first CORESET pool, a first CORESET group, or a first TRP) may correspond to a first transmission element (e.g., a first antenna panel, a first RS set, a first RS candidate set, etc.). The second transmission target (e.g., a second CORESET pool, a second CORESET group, or a second TRP) may correspond to a second transmission element (e.g., a second antenna panel, a second RS set, a second RS candidate set, etc.). Furthermore, the first transmission target may correspond to the at least one first transmission element, and the second transmission target may correspond to at least one second transmission element.

For example, when the transmission element corresponds to the RS set or the RS candidate set, the RS may include at least one of an RS related to an uplink TCI state, or an RS related to spatial relation info.

Figure 9:
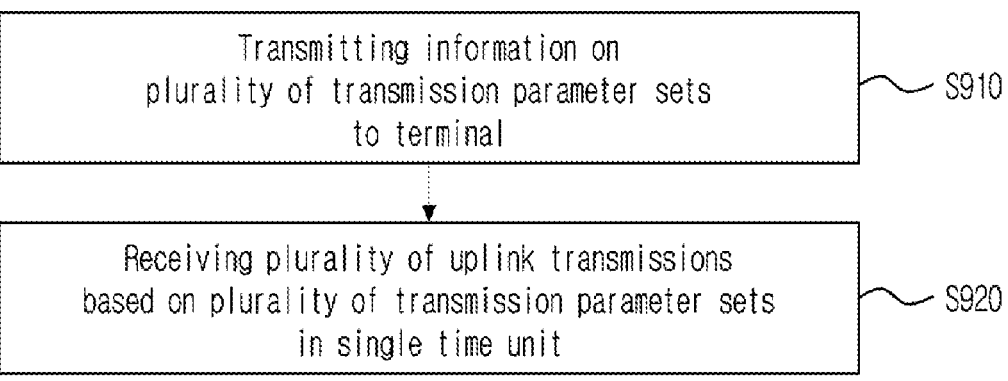
FIG. 9 is a diagram for describing an example of a method of receiving an uplink transmission be a base station according to the present disclosure.

FIG. 9 is a diagram for illustrating an example of an uplink reception method of a base station according to the present disclosure.

In step S910, the base station may transmit information on a plurality of transmission parameter sets to the terminal.

In step S920, the base station may receive a plurality of uplink transmissions based on a plurality of transmission parameter sets in a single time unit.

Specific examples of the transmission parameter set, the transmission element of the terminal (i.e., the reception source of the base station), and the transmission target of the terminal (i.e., the reception element of the base station) are the same as those described in FIG. 8, so the redundant descriptions are omitted.

In the examples of FIG. 8 and FIG. 9, for each of a plurality of transmission elements (e.g., a plurality of antenna panels, a plurality of RS sets, a plurality of RS candidate sets, etc.), the related capability information related may be reported (in advance) from the terminal to the network. The base station may refer to the capability information of the terminal, and may configure/indicate to the terminal a transmission parameter related to a transmission target (e.g., CORESET pool, CORESET group, TRP) and/or a transmission element (e.g., antenna panel, RS set, RS candidate set, etc.).

Hereinafter, for clarity of explanation, it will be described assuming a panel as a representative example of a transmission element of a terminal, assuming a CORESET pool corresponding to TRP as a specific example of a transmission target of the terminal, but the scope of the present disclosure is not limited to the example.

Embodiment 1

In the multiple DCI (MDCI)-based MTRP transmission scheme, a plurality of TRPs may transmit a PDCCH through a CORESET belonging to its respective CORESET pool, and transmission/scheduling for PDSCH/PUSCH/PUCCH may be performed through the corresponding PDCCH. For example, the COERSET pool in which the DCI/PDCCH scheduling PUSCH/PUCCH is transmitted may be assumed as linked/associated with the corresponding PUSCH/PUCCH. According to the conventional scheme, TDM is guaranteed (i.e., transmitted on different time resource units) between PUSCHs/PUCCHs linked to different CORESET pools, so that simultaneous uplink transmission is excluded.

When the above-described MDCI-based MTRP transmission scheme is applied to a terminal supporting STxMP, it is not required to guarantee TDM between PUSCHs/PUCCHs linked to different CORESET pools, and simultaneous uplink transmission may be performed. For example, UL TCI state 1 corresponding to panel 1 may be configured for PUSCH 1 linked to CORESET pool 0, and UL TCI state 2 corresponding to panel 2 may be configured for PUSCH 2 linked to CORESET pool 1. In this case, the STxMP terminal may perform PUSCH 1 transmission using panel 1 and PUSCH 2 transmission using panel 2 simultaneously.

Here, panel 1 and panel 2 may have different antenna implementation schemes, antenna shapes, number of antennas, and uplink channel characteristics. Therefore, it is preferable to configure/apply uplink transmission parameters individually or independently for each panel (or a CORESET pool corresponding to the panel).

According to the conventional scheme, the transmit antenna configuration and TPMI-related parameters of the terminal (e.g., codebook subset restriction, maximum rank, number of antenna ports, full power mode, etc.) are commonly configured/applied, and cannot be configured separately for each CORESET pool. Specifically, according to the conventional method, for transmit antenna configuration and TPMI-related parameters, parameters such as txConfig, maxRank, codebookSubset, FullPowerTransmission, etc. may be defined in the PUSCH-config information element (IE), which is included in RRC signaling, and these parameters are commonly configured/applied for all CORESET pools.

Here, the txConfig parameter may be related to whether the terminal uses codebook-based or non-codebook-based transmission (e.g., codebook, nonCodebook, etc.). The maxRank parameter may be related to a subset of the PMI (e.g., 1, 2, 3, 4 . . . ) addressed by a transmit rank incator (TRI) within a range from 1 to maximum uplink rank (e.g., a number of layers). The codebookSubset parameter may be related to a subset of PMI (e.g., fullyAndPartialAndNon-Coherent, partialAndNonCoherent, noncoherent, etc.) addressed by the TPMI among PMIs supported by the terminal with the maximum coherence capability. The Full-PowerTransmission parameter may be related to a full power transmission mode (e.g., fullpower, fullpowerMode1, full-powerMode2, etc.).

That is, according to the conventional scheme, the panel-specific characteristics of the STxMP terminal cannot be considered, and there is a limitation that the uplink transmission parameter is commonly applied to different panels.

In order to solve this problem, a new solution of individually configuring/applying the transmit antenna configuration and TPMI-related parameters of the terminal for each CORESET pool is required.

According to the present disclosure, a plurality of parameters may be defined, and the CORESET pool and the parameter may be mapped one-to-one and used. That is, one parameter is configured/applied for each of the plurality of CORESET pools, and the values of parameters configured/ applied for the plurality of CORESET pools may be independent/individual. In the present disclosure, the meaning of being independent or individually does not necessarily require that the values are different, and includes cases in which independently/individually configured values are the same. Here, the parameter independently configured/applied for each CORESET pool may correspond to at least one of the aforementioned TPMI-related parameters (e.g., txConfig, maxRank, codebookSubset, FullPowerTransmission).

First, an example of the FullPowerTransmission parameter will be described.

For example, FullPowerTransmission parameter may be extended to a plural number of parameters, and be associated/mapped with a plurality of CORESET pools. For example, FullPowerTransmission0 and FullPowerTransmission1 parameters may be defined, and mapped to CORESET pool 0 and CORESET pool 1, respectively. Accordingly, for a PUSCH associated with CORESET pool 0 (e.g., scheduled by DCI/PDCCH received through a CORESET belonging to CORESET pool 0), TPMI may be configured/applied based on the FullPowerTransmission0 parameter, and the full power mode configured by the FullPowerTransmission0 parameter may be applied. For a PUSCH associated with CORESET pool 1 (e.g., scheduled by DCI/PDCCH received through a CORESET belonging to CORESET pool 1), TPMI may be configured/applied based on the FullPowerTransmission1 parameter, and the full power mode configured by the FullPowerTransmission1 parameter may be applied.

For example, when uplink transmission panel 1 associated with CORESET pool 0 does not support full power transmission, and uplink transmission panel 2 associated with CORESET pool 1 supports full power mode 1, the FullPowerTransmission0 parameter may not be configured (or may be configured with a null value), and the value of the FullPowerTransmission1 parameter may be configured as full power mode 1. Accordingly, the uplink codebook which is used when full power transmission is not configured is applied to the PUSCH transmission associated with CORESET pool 0, and does not operate according to the full power transmission mode. The terminal may apply the uplink codebook which used in full power mode 1 to PUSCH transmission associated with CORESET pool 1, and may operate according to full power mode 1.

In addition, in the case of full power mode 2, the terminal may report to the network a PMI capable of operating in the full power mode among PMIs constituting the uplink codebook as capability information of the terminal. For example, a PMI capable of operating in a full power mode may vary according to an antenna implementation scheme. Here, when the terminal includes a plurality of panels, the antenna implementation scheme may be different for each panel, and therefore, even if each of the plurality of panels supports full power mode 2, the set of PMIs capable of operating in the full power mode may be different for each panel.

According to the present disclosure, the terminal may report a PMI set capable of operating in the full power mode for each panel separately. For example, the terminal may report PMI set 0 capable of operating in full power mode for panel 1, and PMI set 1 capable of operating in full power mode for panel 2. PMI set 0 may be linked/configured for CORESET pool 0, and PMI set 1 may be linked/configured for CORESET pool 1. When PUSCH is scheduled as full power mode 2 through DCI of CORESET pool 0 for the terminal, full power transmission may be performed based on PMI set 0 linked to CORESET pool 0. When PUSCH is scheduled as full power mode 2 through DCI of CORESET pool 1 for the terminal, full power transmission may be performed based on PMI set 1 linked to CORESET pool 1.

The panel and the CORESET pool may be linked/mapped in one-to-one manner, or may be linked/mapped in many-to-one manner or one-to-many manner. A panel and a PMI set may be linked/mapped in one-to-one manner, or may be linked/mapped in many-to-one or one-to-many manner.

Next, an example of the codebookSubset parameter will be described.

For example, a codebookSubset parameter may be extended to a plural number of parameters, and be associated/mapped with a plurality of CORESET pools. For example, codebookSubset0 and codebookSubset1 parameters may be defined, and mapped to CORESET pool 0 and CORESET pool 1, respectively. Accordingly, for a PUSCH associated with CORESET pool 0 (e.g., scheduled by DCI/PDCCH received through CORESET belonging to CORE-SET pool 0), TPMI may be configured/applied based on the codebookSubset0 parameter. For a PUSCH associated with CORESET pool 1 (e.g., scheduled by DCI/PDCCH received through CORESET belonging to CORESET pool 1), TPMI may be configured/applied based on the codebookSubset1 parameter.

For example, when the uplink transmission panel 1 associated with CORESET pool 0 is configured with non-coherent antenna ports, and the uplink transmission panel 2 associated with CORESET pool 1 is configured with coherent antenna ports, the value of the codebookSubset0 parameter may be configured as noncoherent, and the value of the codebookSubset1 parameter may be configured as fullyAnd-PartialAndNonCoherent. Accordingly, for the terminal, the TPMI indicated through the DCI of the CORESET pool 0 may indicate a noncoherent codebook (CB), and the TPMI indicated through the DCI of the CORESET pool 1 may indicate the fullyAndPartialAndNonCoherent CB.

Next, an example of the txConfig parameter will be described.

For example, a txConfig parameter may be extended to a plural number of parameters, and be associated/mapped to a plurality of CORESET pools. For example, txConfig0 and txConfig1 parameters may be defined and mapped to CORE-SET pool 0 and CORESET pool 1, respectively. Accordingly, codebook-based or non-codebook-based PUSCH transmission may be configured/applied based on the txConfig0 parameter for PUSCH associated with CORESET pool 0 (e.g., scheduled by DCI/PDCCH received through CORE-SET belonging to CORESET pool 0). Codebook-based or non-codebook-based PUSCH transmission may be configured/applied based on the txConfig1 parameter for PUSCH associated with CORESET pool 1 (e.g., scheduled by DCI/PDCCH received through CORESET belonging to CORE-SET pool 1).

Next, an example of the maxRank parameter will be described.

For example, a maxRank parameter may be extended to a plural number of parameters, and be associated/mapped to a plurality of CORESET pools. For example, maxRank0 and maxRank1 parameters may be defined, and mapped to CORESET pool 0 and CORESET pool 1, respectively. Accordingly, the maximum rank value (e.g. 1, 2, 3, 4, . . . ) may be configured/applied based on the maxRank0 parameter for PUSCH associated with CORESET pool 0 (e.g., scheduled by DCI/PDCCH received through CORESET belonging to CORESET pool 0). The maximum rank value (e.g. 1, 2, 3, 4, . . . ) may be configured/applied based on the maxRank1 parameter for PUSCH associated with CORE- SET pool 1 (e.g., scheduled by DCI/PDCCH received through CORESET belonging to CORESET pool 1).

In addition, a beam (e.g., spatial relation information, uplink TCI state) applied to PUSCH transmission may be indicated through the SRI field of DCI. For example, an SRS resource being a reference for configuring/indicating a PUSCH transmission beam may be indicated by an SRI field of DCI. In addition, the SRI field may indicate an SRS resource in the SRS resource set. When a plurality of CORESET pools are configured, an SRS resource set may be separately configured for each CORESET pool. For example, for a PUSCH associated with CORESET pool 0 (e.g., scheduled by a DCI/PDCCH received through a CORESET belonging to CORESET pool 0), the PUSCH may be scheduled based on an SRS resource belonging to an SRS resource set (e.g., SRS resource set 0) associated/configured with CORESET pool 0. For a PUSCH associated with CORESET pool 1 (e.g., scheduled by a DCI/PDCCH received through a CORESET belonging to CORESET pool 1), the PUSCH may be scheduled based on an SRS resource belonging to an SRS resource set (e.g., SRS resource set 1) associated/configured with CORESET pool 1. That is, the SRI field of DCI of CORESET pool 0 may indicate the SRS resource belonging to the SRS resource set of CORESET pool 0, and the SRI field of DCI of CORESET pool 1 may indicate the SRS resource belonging to the SRS resource set of CORESET pool 1.

Before the base station configures/indicates the above-described transmission parameters to the terminal, the terminal may report its own capability (i.e., a parameter value supportable by the terminal) related to the corresponding transmission parameter. Here, the STxMP terminal may report the capability information for each of the plurality of panels separately. Alternatively, the case of performing uplink transmission in the STxMP scheme (or performing uplink transmission through a plurality of panels in a single time unit (or simultaneously)) and the case of performing uplink transmission through a single panel in a single time unit may be distinguished, and the terminal may report the capability for each case separately. For example, for the case of uplink transmission in the STxMP scheme, and for the case otherwise, capability information for the full power mode, codebook subset restriction (CBSR), a combination of PMIs supporting the full power mode transmission, etc. may be reported separately.

Embodiment 2

According to the conventional scheme, the base station may configure through RRC the identification information (e.g., SRI-PUSCH-PowerControl ID) of the power control parameter set to each codepoint of the SRI field for PUSCH power control. Accordingly, when a specific codepoint is indicated through the SRI field of the DCI, the terminal may apply the power control parameter set configured for the indicated codepoint. Here, according to the conventional, a codepoint related to a power control parameter set is defined/configured without distinguishing a CORESET pool for the SRI field. Accordingly, the number of codepoints related to the power control parameter set that can be indicated for each CORESET pool is reduced. For example, in the case of a 3-bit SRI field, a maximum of 8 codepoints may be defined. Among the 8 codepoints, 4 may be configured with power control parameter sets applied to PUSCH transmission associated with CORESET pool 0, and the remaining 4 may be configured with power control parameter sets suitable for PUSCH transmission related to CORE-

|

SET pool 1. In this case, since the number of power control parameter sets that can be actually indicated in each CORESET pool is only 4, the degree of freedom of the power control configuration of the base station is lowered.

According to the present disclosure, for each of a plurality of CORESET pools, codepoints related to a power control parameter set for the SRI field may be configured independently/individually.

For example, a codepoint related to the power control parameter set indicated by the SRI field of DCI linked to CORESET pool 0, and a codepoint related to the power control parameter set indicated by the SRI field of DCI linked to CORESET pool 1 may be separately configured. That is, the codepoint for the 1-bit SRI field of the DCI linked to CORESET pool 0 may be configured as SRI-PUSCH-PowerControl ID={1,2}, and the codepoint for the 1-bit SRI field of the DCI linked to CORESET pool 1 may be configured as SRI-PUSCH-PowerControl ID={3,4}. Accordingly, for PUSCH transmission associated with CORESET pool 0 (e.g., scheduled by DCI/PDCCH received through CORESET belonging to CORESET pool 0), a power control parameter set of either one of SRI-PUSCH-PowerControl ID 1 or 2 may be applied according to the value of the 1-bit SRI field. For PUSCH transmission associated with CORESET pool 1 (e.g., scheduled by DCI/PDCCH received through CORESET belonging to CORESET pool 1), a power control parameter set of either one of SRI-PUSCH-PowerControl ID 3 or 4 may be applied according to the value of the 1-bit SRI field.

In addition, the SRI field of DCI may indicate SRS resources for determining an antenna port and a transmission beam applied to PUSCH transmission as well as a configuration for a power control parameter set. According to the present disclosure, the indication of the SRS resource may also be independently performed for each of the plurality of CORESET pools. For example, the SRI field of DCI linked to CORESET pool 0 may indicate an SRS resource among SRS resource set X (e.g., X=0), and the SRI field of DCI linked to CORESET pool 1 may indicate an SRS resource among SRS resource set Y (e.g., Y=1). The values of X and Y may be configured by the base station through signaling for the terminal, or may be predefined as specific values without signaling between the base station and the terminal.

Embodiment 3

Similar to the TPMI-related parameters of Embodiment 1, the PUSCH data scrambling identification information (e.g., dataScramblingIdentityPUSCH) parameter in the PUSCH-Config IE may be extended to a plural number of parameters, and be associated/mapped to a plurality of CORESET pools. The PUSCH data scrambling identification information means identification information used to initialize data scrambling for the PUSCH, and may have values of, for example, 1, 2, 3, . . . , 1023.

For example, dataScramblingIdentityPUSCH0 and dataScramblingIdentityPUSCH1 parameters may be defined, and mapped to CORESET pool 0 and CORESET pool 1, respectively. Accordingly, scrambling may be configured/applied based on the dataScramblingIdentityPUSCH0 parameter for PUSCH associated with CORESET pool 0 (e.g., scheduled by DCI/PDCCH received through CORESET belonging to CORESET pool 0). Scrambling may be configured/applied based on the dataScramblingIdentityPUSCH1 parameter for PUSCH associated with CORESET pool 1 (e.g., scheduled by DCI/PDCCH received through CORESET belonging to CORESET pool 1).

Accordingly, when the terminal transmits a plurality of PUSCHs in a single time unit (e.g., simultaneously), interference between the plurality of PUSCHs may be mitigated.

Embodiment 4

In the above-described examples, methods of independently/individually configuring TPMI-related parameters (e.g., full power transmission information, codebook subset information, transmission configuration (tx config) information, or maximum rank (maxrank), etc.), SRS resource-related parameters (e.g., SRI-related power control parameters, reference SRS resource sets, etc.), scrambling-related information (e.g., data scrambling identity information for PUSCH, etc.) for each panel and/or for each CORESET pool have been described. For example, a plurality of panels may be mapped to a plurality of CORESET pools in one-to-one manner. Alternatively, the panel(s) and CORESET pool(s) may be mapped in one-to-many manner or in many-to-one manner.

The mapping relationship between the CORESET pool (or TRP) and the panel may be easily or dynamically changed according to the rotation of the terminal or the like. For example, at some point in time, it may be appropriate to transmit the uplink CH/RS towards the TRP of the CORESET pool 0 through panel 1 and the uplink CH/RS towards the TRP of the CORESET pool 1 through panel 2, and at another point in time, it may be appropriate to transmit the uplink CH/RS towards the TRP of the CORESET pool 0 through panel 2 and the uplink CH/RS towards the TRP of the CORESET pool 1 through panel 1. Therefore, in independently/individually configuring TPMI-related information, SRS resource-related information, scrambling-related information, etc. for each panel and/or for each CORESET pool, a dynamic configuration/indication scheme through MAC CE/DCI is more advantageous than a semi-static configuration/indication scheme through RRC signaling.

According to the present disclosure, information indicating to which panel (or CORESET pool) from among a plurality of panels (or CORESET pool) the transmission parameter set (e.g., TPMI-related information, SRS resource-related information, scrambling-related information, etc.) is applied may be further defined in DCI. For example, a 1-bit field may be added to the DCI to indicate to which panel among panel 1 or panel 2 (or for which CORESET pool among CORESET pool 0 or CORESET pool 1) the transmission parameter set is to be applied.

Additionally or alternatively, based on SRS resource set indication information in DCI, when SRS resource set 0 is indicated, a transmission parameter set (e.g., TPMI related information, scrambling related information etc.) associated with SRS resource set 0 may be applied, and when SRS resource set 1 is indicated, a transmission parameter set (e.g., TPMI related information, scrambling related information, etc.) associated with SRS resource set 1 may be applied. Alternatively, based on the SRS resource set indication information in DCI, when SRS resource set 0 is indicated, the transmission parameter set may be applied to panel 1 (or panel 2), and when SRS resource set 1 is indicated, the transmission parameter set may be applied to panel 2 (or panel 1). Alternatively, based on the SRS resource set indication information in DCI, when SRS resource set 0 is indicated, the transmission parameter set may be applied for CORESET pool 0 (or CORESET pool 1), and when SRS resource set 1 is indicated, the transmission parameter set may be applied for CORESET pool 1 (or CORESET pool 0). To this end, the linkage/association/ mapping relationship between the TPMI-related informa-
tion/scrambling-related information and the SRS resource
set may be configured/defined in advance.

Additionally or alternatively, the transmission parameter
set for each CORESET pool may be changed, based on that
the terminal reports to the base station that the terminal
switches/changes the panel-specific configuration for the
CORESET pool 0 and the panel-specific configuration for
the CORESET pool 1, and the base station confirms that. For
example, a panel-specific configuration may include a trans-
mission parameter set for a specific panel.

Additionally or alternatively, instead of switching/chang-
ing the mapping relationship between the CORESET pool
and the panel by the terminal, the transmission parameter set
for each CORESET pool may be changed, based on that the
terminal changes the panel-specific configuration (or trans-
mission parameter set) of each CORESET pool and reports
the changed information to the base station, and the base
station confirms that.

If the base station does not confirm/acknowledge the
report on change/switch of the mapping relationship or
configuration of the terminal, the terminal does not apply the
transmission parameter set according to the change/switch,
and the previous transmission parameter set may be applied.

Embodiment 5

In addition to the above-described examples for MDCI-
based MTRP transmission, examples of the present disclo-
sure related to single DCI (SDCI)-based MTRP uplink
transmission will be described.

Uplink transmission (e.g., PUSCH transmission) through
one panel may be performed by turning on or activating one
panel from among a plurality of panels of the terminal, and
turning off or deactivating another panel. In this case, only
one field/parameter may be used among the plurality of
fields/parameters (e.g., TPMI, phase tracking reference sig-
nal (PTRS), transmit power control (TPC), etc.) which is
extended to support uplink transmission for two TRPs (or
two CORESET pools). The remaining field(s)/parameter(s)
that are not used may be used/interpreted for other purposes.
For example, if the field size is increased by combining two
TPMI fields into one, a high-resolution codebook having
finer granularity than an conventional codebook may be
utilized.

An operation of turning on/activating one panel and
turning off/deactivation of another panel may be performed
through an SRS resource set indication field of DCI. For
example, when one of a plurality of SRS resource sets is
indicated through the SRS resource set indication field, the
panel corresponding to the not-indicated SRS resource set(s)
may be regarded/interpreted as turned-off/deactivated.

Additionally, one (or more) specific codepoint among
codepoints that may be indicated by the SRI field of DCI
may be configured to indicate turning-off/deactivation of a
specific panel.

General Device to which the Present Disclosure May be
Applied

Figure 10:
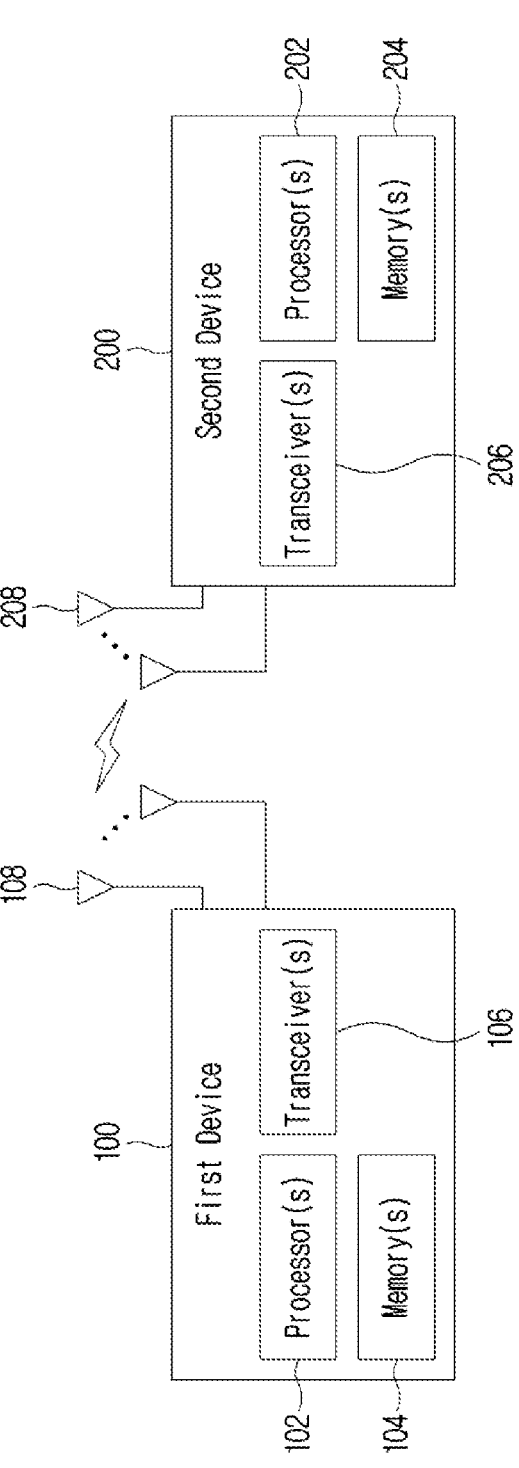
FIG. 10 illustrates a block diagram of a wireless communication system according to an embodiment of the present disclosure.

FIG. 10 is a diagram which illustrates a block diagram of
a wireless communication system according to an embodi-
ment of the present disclosure.

In reference to FIG. 10, a first wireless device 100 and a
second wireless device 200 may transmit and receive a
wireless signal through a variety of radio access technolo-
gies (e.g., LTE, NR).

A first wireless device 100 may include one or more
processors 102 and one or more memories 104 and may additionally include one or more transceivers 106 and/or one
or more antennas 108. A processor 102 may control a
memory 104 and/or a transceiver 106 and may be configured
to implement description, functions, procedures, proposals,
methods and/or operation flow charts included in the present
disclosure. For example, a processor 102 may transmit a
wireless signal including first information/signal through a
transceiver 106 after generating first information/signal by
processing information in a memory 104. In addition, a
processor 102 may receive a wireless signal including
second information/signal through a transceiver 106 and
then store information obtained by signal processing of
second information/signal in a memory 104. A memory 104
may be connected to a processor 102 and may store a variety
of information related to an operation of a processor 102.
For example, a memory 104 may store a software code
including commands for performing all or part of processes
controlled by a processor 102 or for performing description,
functions, procedures, proposals, methods and/or operation
flow charts included in the present disclosure. Here, a
processor 102 and a memory 104 may be part of a commu-
nication modem/circuit/chip designed to implement a wire-
less communication technology (e.g., LTE, NR). A trans-
ceiver 106 may be connected to a processor 102 and may
transmit and/or receive a wireless signal through one or
more antennas 108. A transceiver 106 may include a trans-
mitter and/or a receiver. A transceiver 106 may be used
together with a RF (Radio Frequency) unit. In the present
disclosure, a wireless device may mean a communication
modem/circuit/chip.

A second wireless device 200 may include one or more
processors 202 and one or more memories 204 and may
additionally include one or more transceivers 206 and/or one
or more antennas 208. A processor 202 may control a
memory 204 and/or a transceiver 206 and may be configured
to implement description, functions, procedures, proposals,
methods and/or operation flows charts included in the pres-
ent disclosure. For example, a processor 202 may generate
third information/signal by processing information in a
memory 204, and then transmit a wireless signal including
third information/signal through a transceiver 206. In addi-
tion, a processor 202 may receive a wireless signal including
fourth information/signal through a transceiver 206, and
then store information obtained by signal processing of
fourth information/signal in a memory 204. A memory 204
may be connected to a processor 202 and may store a variety
of information related to an operation of a processor 202.
For example, a memory 204 may store a software code
including commands for performing all or part of processes
controlled by a processor 202 or for performing description,
functions, procedures, proposals, methods and/or operation
flow charts included in the present disclosure. Here, a
processor 202 and a memory 204 may be part of a commu-
nication modem/circuit/chip designed to implement a wire-
less communication technology (e.g., LTE, NR). A trans-
ceiver 206 may be connected to a processor 202 and may
transmit and/or receive a wireless signal through one or
more antennas 208. A transceiver 206 may include a trans-
mitter and/or a receiver. A transceiver 206 may be used
together with a RF unit. In the present disclosure, a wireless
device may mean a communication modem/circuit/chip.

Hereinafter, a hardware element of a wireless device 100,
200 will be described in more detail. It is not limited thereto,
but one or more protocol layers may be implemented by one
or more processors 102, 202. For example, one or more
processors 102, 202 may implement one or more layers
(e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
    receiving, by a terminal from a network, configuration information on a first sounding reference signal (SRS) resource set including a first at least one SRS resource, and a second SRS resource set including a second at least one SRS resource,
    wherein the first SRS resource set is associated with a first control resource set (CORESET) pool and the second SRS resource set is associated with a second CORESET pool; and based on a first physical downlink control channel (PDCCH) scheduling a first physical uplink shared channel (PUSCH) and a second PDCCH scheduling a second PUSCH, transmitting, by the terminal to the network, the first PUSCH and the second PUSCH,
    wherein first SRS resource indicator information included in downlink control information (DCI) of the first PDCCH associated with the first CORESET pool indicates an SRS resource of the first at least one SRS resource in the first SRS resource set associated with the first CORESET pool,
    wherein second SRS resource indicator information included in DCI of the second PDCCH associated with the second CORESET pool indicates an SRS resource of the second at least one SRS resource in the second SRS resource set associated with the second CORESET pool,
    wherein the first PUSCH and the second PUSCH are fully or partially overlapping in a time domain, and
    wherein an SRS is an uplink physical signal.

2. The method of claim 1, wherein:
    wherein each of a first transmission parameter set is associated with the first CORESET pool and includes information related to a first transmit precoding matrix indicator (TPMI), and a second transmission parameter set is associated with the second CORESET pool includes information related to a second (TPMI),
    the information related to first TPMI includes at least one of first full power transmission information, first codebook subset information, first transmission configuration (tx config) information, or first maximum rank (max rank) information, and
    the information related to second TPMI includes at least one of second full power transmission information, second codebook subset information, second transmission configuration (tx config) information, or second maximum rank (max rank) information.

3. The method of claim 1, wherein:
    wherein a first transmission parameter set associated with the first CORESET pool and includes information related to a first SRS resource, and a second transmission parameter set associated with the second CORESET pool includes information related to a second SRS resource,
    the information related to the first SRS includes at least one of first power control information, antenna port information, or first reference SRS resource information, and
    the information related to the second SRS includes at least one of second power control information, second antenna port information, or second reference SRS resource information.

4. The method of claim 1, wherein:
    wherein a first transmission parameter set associated with the first CORESET pool and includes first information related to scrambling, and a second transmission parameter set associated with the second CORESET pool includes second information related to scrambling,
    the first information related to scrambling includes at least one of a first data scrambling identity information for a first PUSCH, and
    the second information related to scrambling includes at least one of a second data scrambling identity information for a second PUSCH.

5. The method of claim 4, wherein:
    the first transmission parameter set is associated with the first CORESET pool includes at least one of first information related to TPMI, first information related to SRS, or first information related to scrambling, and the second transmission parameter set is associated with the second CORESET pool includes at least one of second information related to TPMI, second information related to SRS, or second information related to scrambling.

6. A terminal comprising:

at least one transceiver; and at least one processor connected to the at least one transceiver, wherein the at least one processor is configured to:

receive, from a network through the at least one transceiver, configuration information on a first sounding reference signal (SRS) resource set including a first at least one SRS resource, and a second SRS resource set including a second at least one SRS resource, wherein the first SRS resource set is associated with a first control resource set (CORESET) pool and the second SRS resource set is associated with a second CORESET pool; and based on a first physical downlink control channel (PDCCH) scheduling a first physical uplink shared channel (PUSCH) and a second PDCCH scheduling a second PUSCH, transmit, to the network through the at least one transceiver, the first PUSCH and the second PUSCH, wherein first SRS resource indicator information included in downlink control information (DCI) of the first PDCCH associated with the first CORESET pool indicates an SRS resource of the first at least one SRS resource in the first SRS resource set associated with the first CORESET pool, wherein second SRS resource indicator information included in DCI of the second PDCCH associated with the second CORESET pool indicates an SRS resource of the second at least one SRS resource in the second SRS resource set associated with the second CORESET pool, wherein the first PUSCH and the second PUSCH are fully or partially overlapping in a time domain, and wherein an SRS is an uplink physical signal.

7. A base station comprising:

at least one transceiver; and at least one processor connected to the at least one transceiver, wherein the at least one processor is configured to:

transmit, to a terminal through the at least one transceiver, configuration information on a first sounding reference signal (SRS) resource set including a first at least one SRS resource, and a second SRS resource set including a second at least one SRS resource, wherein the first SRS resource set is associated with a first control resource set (CORESET) pool and the second SRS resource set is associated with a second CORESET pool; and receive, from the terminal through the at least one transceiver, a first physical uplink shared channel (PUSCH) and a second PUSCH that are based on a first physical downlink control channel (PDCCH) scheduling the first PUSCH and a second PDCCH scheduling the second PUSCH, wherein first SRS resource indicator information included in downlink control information (DCI) of the first PDCCH associated with the first CORESET pool indicates an SRS resource of the first at least one SRS resource in the first SRS resource set associated with the first CORESET pool, wherein second SRS resource indicator information included in DCI of the second PDCCH associated with the second CORESET pool indicates an SRS resource of the second at least one SRS resource in the second SRS resource set associated with the second CORESET pool, wherein the first PUSCH and the second PUSCH are fully or partially overlapping in a time domain, and wherein an SRS is an uplink physical signal.

* * * * *